United States Patent [19]

Joo' et al.

[11] 4,143,217

[45] Mar. 6, 1979

[54] PROCESS FOR MANUFACTURE OF POSITIVE ELECTRODE FOR LITHIUM/METAL SULFIDE SECONDARY CELL

[75] Inventors: Louis A. Joo'; Frederick C. Miller, both of Johnson City, Tenn.

[73] Assignee: Great Lakes Carbon Corporation, New York, N.Y.

[21] Appl. No.: 838,756

[22] Filed: Oct. 3, 1977

[51] Int. Cl.$^2$ .............................................. H01M 4/36
[52] U.S. Cl. ................................... 429/218; 429/220; 429/221; 429/223; 252/506; 252/182.1; 264/29.6; 264/29.7
[58] Field of Search ............................ 252/506, 182.1; 264/29.6, 29.7; 429/232, 220, 221, 223, 218

[56] References Cited

U.S. PATENT DOCUMENTS

| | | | |
|---|---|---|---|
| 3,925,098 | 2/1975 | Saunders et al. | 429/103 |
| 4,011,374 | 3/1977 | Kaun | 429/220 |

*Primary Examiner*—Benjamin R. Padgett
*Assistant Examiner*—E. Suzanne Parr
*Attorney, Agent, or Firm*—Adrian J. Good

[57] ABSTRACT

A positive electrode for a rechargeable electrical energy storage device containing a lithium or lithium-aluminum negative electrode, an electrolyte with lithium ions, and a positive electrode formed by impregnating a molded iron sulfide compact with a pitch or thermosetting resin, and subsequently carbonizing the pitch or resin to form an in situ carbon structure, to serve as the foundation for the electrode.

9 Claims, No Drawings

PROCESS FOR MANUFACTURE OF POSITIVE ELECTRODE FOR LITHIUM/METAL SULFIDE SECONDARY CELL

BACKGROUND OF THE INVENTION

1. Field of the Invention

This invention relates to a high-temperature electrically regenerable system. More particularly it relates to an improved method for manufacture of a metal chalcogenide positive electrode providing simplicity and lower cost of manufacture with improved control of pore volumes and electrical conductivity, for use in a lithium-metal sulfide secondary cell.

2. Description of the Prior Art

Cells using lithium in the negative electrode with a molten or fused salt electrolyte have been extensively studied, utilizing either molten lithium or a solid alloy of lithium with aluminum as the negative electrode, a molten salt electrolyte such as the eutectic lithium and potassium chloride binary composition, a porous separator and a positive electrode of a metal sulfide such as copper sulfide, iron sulfide or nickel sulfide, or of elemental sulfur.

In order to develop a high energy density and the high electrical conductivity necessary for good performance in such a cell, it is desirable that the electrode material be in a finely divided state and that the particles of the solid electrode be contacted by an electrically conductive material.

Methods used previously have included the use of a carbon or graphite felt as a matrix which is then impregnated with sulfur or filled with the metal sulfide. The use of carbon foam and the use of a thermosetting binder which is then carbonized and/or graphitized to form a matrix holding the metal sulfide or other chalcogenide have been suggested.

These methods use a lattice or matrix of the porous carbon which is then impregnated with the positive electrode material, by mechanical means such as merely vibratory filling, by impregnating with a solvent carried mixture or by melting and subsequent impregnation, as in the case with elemental sulfur.

Repeated cycling of the lithium-sulfur cell results in a gradual loss of the sulfur by vaporization, reducing the feasibility of use of sulfur as a positive electrode material. Use of metal sulfides, which are non-volatile solids at the operational temperature, alleviates this difficulty but introduces another, namely that the operation of the cell with iron sulfide introduces the problem that as lithium sulfide forms, the iron is reduced in the cathodic reaction with a consequent volume increase, since the combination of lithium sulfide and iron has a higher volume than the iron sulfide. Consequent volume expansion and contraction put stresses on the matrix which, if it is rigid, will be destroyed eventually on cycling of the cell, making the cell useless.

This difficulty has been alleviated by filling a felt incompletely, leaving room within the lattice work for expansion; or by filling the felt or foam with a subliming type solid; or by impregnating the felt with a thermosetting resin which, on crosslinking, loses solvents and is then carbonized, producing a porous lattice or matrix with which the solid electrode material may expand.

An example of past practice using this approach is embodied in U.S. Pat. No. 4,011,374 to Thomas D. Kaun which discloses an electrode composition of thermosetting carbonaceous material, particles of the electrode material, and a sublimable solid, forming a moldable semi-solid. After molding, the paste is heated to cure the thermosetting resin and volatilize or sublime the solid which then forms a matrix with interstices into which the solid electrode material may expand. Saunders and Heredy, U.S. Pat. No. 3,925,098, disclose a porous felt body of resilient carbon or graphite fibers as a matrix which is impregnated with metal sulfide by a vibratory filling.

SUMMARY OF THE INVENTION

An object of the present invention is a new and improved process for the production of a positive electrode in a lithium-molten salt-transition metal sulfide electrical energy storage device having a longer useful life and a lower manufacturing cost than is presently attainable by known methods. A rechargeable energy storage device is provided which includes a negative electrode containing lithium, a fused salt electrolyte containing lithium ions, a porous separator, and an improved positive electrode containing iron sulfides, a thermosetting resin or high coke yield pitch, either with or without chopped fibers in the mixture, and a solid sublimable or carbonizable filler material.

A mixture of iron sulfide, resin or pitch, and filler is molded or extruded into a preformed electrode and is then heated to cross-link the thermosetting resin and volatilize the solvents in the thermosetting resin composition, then further heated to a temperature less than 1000° C. to carbonize the binder forming a matrix and volatilizing the filler. The resulting electrode is iron sulfide bound in a carbonaceous matrix, with ample room in the interstices of the matrix formed by volatilization of the filler, for expansion of the iron sulfide during the reaction at the electrode of reduction of the iron sulfide to iron and the formation of lithium sulfide.

Although the present invention is directed to the use of iron sulfides, other transition metal sulfides and chalcogenides or mixtures thereof may be used including copper sulfide, nickel sulfide, cobalt sulfide, the oxides, the selenides, and the tellurides.

The cell also uses a lithium negative electrode which may be in the form of the liquid lithium or of the solid alloy of lithium with zinc, aluminum, or silicon, with an inorganic porous separator.

The electrolyte is a lithium halide or a eutectic mixture of a lithium halide and another alkali metal or alkaline earth metal halide. The preferred electrolyte is the eutectic mixture of lithium chloride and potassium chloride.

DESCRIPTION OF THE PREFERRED EMBODIMENT

The positive electrode is formed by compression molding iron sulfide and a subliming filler in a dry blend at about 1000 pounds per square inch. This molded compact is then impregnated with thermosetting resin solution or with a hot melted pitch. Typical quantities (parts by weight) are 100 iron sulfide, 50 resin solution and 70 cellulose or polyethylene powders. The compact is preferably impregnated under alternating vacuum and pressure cycles so that the complete body is impregnated throughout the electrode.

This molded part is subjected to a cure cycle of approximately 100°–200° C. for one to 12 hours with 150° C. for 8 hours preferred to cure the thermosetting resin. It is then subjected to a carbonizing cycle to approximately 1000° C. under nitrogen for three to six days which will carbonize the thermosetting resin and sublime the filler or decompose the cellulose to gaseous products and char.

The preferred thermosetting resins are phenol formaldehyde resins and furan derivatives exemplified by Durez 7031A and Durez 16470 from Hooker Electrochemical Company. These resins have a high residue when carbonized to temperatures of approximately 950° C. making them suitable candidates for production of a matrix in this application. Coal tar and petroleum pitches with melting points of approximately 70° C. to 250° C. are also well suited for use as a carbonizing binder in this application and are available from numerous sources.

The subliming or decomposing filler may be a salt which sublimes at a fairly low temperature or an organic filler which decomposes or sublimes at some low temperature leaving a void upon the formation of the gas. Ammonium bicarbonate and aluminum chloride have also been used in the past.

Each electrode has approximately 25% by volume iron sulfide held in a carbonaceous matrix or lattice work with consequent room to expand when lithium sulfide is formed during the course of the reaction:

$$2XLi^+ + FeS_x = XLi_2S + Fe_{(s)}.$$

In Example 1:100g of iron sulfide powder of less than 100 mesh particle size and 70 g. of lignin sulfonate powder either dry or its solution in water are molded under 1000 p.s.i.g. in a compression molding press in a steel mold, removed and impregnated with a phenol-formaldehyde condensation resin of 60% non-volatile by weight and 70 centipoise viscosity at 25° C. Impregnation is accomplished by placing the molded piece in a vacuum impregnation chamber, evacuating the chamber, and introducing the resin solution to the full absorption capacity of the piece. The piece is then removed and the resin cross-linked by baking the piece for eight hours at 150° C. This impregnation process is repeated until the desired resin buildup of 30g non-volatile is achieved. The part is then heated to 950° C. in nitrogen atmosphere reaching that temperature in 6 days, at which time the lignin sulfonate is fully decomposed, and the resin carbonized, forming a carbonaceous matrix holding the iron sulfide firmly within the matrix. The impregnated electrode therefore has the following composition;

|  | wt. | % |
|---|---|---|
| iron sulfide | 100g | 50 |
| lignin sulfonate | 70g | 35 |
| resin solids | 30g | 15 |
| TOTAL | 200 | 100 |

In Example 2 the procedure and materials of Example 1 are used with a pregelled starch soluble in cold water substituted for the lignin sulfonate used above.

The resulting electrode has from 15–50% by volume of metal sulfide, from 3–30% by volume of solid carbonaceous matrix, and from 35–82% void volume. The exact percentage will vary with the density and amount of the metal sulfide, the amount of filler, and the treatment conditions used.

We claim:

1. A method for the manufacture of a positive electrode for a secondary electrochemical cell including a lithium or lithium alloy negative electrode, said alloy being selected from the group consisting of the solid alloys with zinc, aluminum or silicon, a fused salt electrolyte of the eutectic mixture of lithium and potassium chlorides, and a porous separator, the improvement comprising the steps of:

(a) mixing metal sulfide selected from the group consisting of the sulfides of iron, copper, cobalt and nickel or mixtures thereof and a filler which sublimes or decomposes at a temperature less than 1000° C. to form gaseous reaction products selected from the group consisting of cellulose, polyethylene, ammonium bicarbonate, aluminum chloride, lignin sulfonate, and pregelled starch;

(b) placing the mixture thus formed in a rigid mold;

(c) compressing said mixture to form a shaped rigid molded part;

(d) impregnating said molded part with a liquid thermosetting resin selected from the group consisting of phenolformaldehyde and furan based resins, in solution or hot melt under alternate cycles of vacuum and pressure;

(e) cross-linking or hardening said liquid resin to a solid, between 100°–200° C. for 1 to 12 hours;

(f) repeating steps d) and e) above until said molded part has a composition of about 15% by wt. resin solids of the total composition; and (g) carbonizing said resin in said molded part and simultaneously subliming or decomposing said filler to gaseous reaction products by increasing the temperature to a temperature less than 1000° C. in an inert atmosphere for a period of 3 to 6 days.

2. The method of claim 1 wherein the metal sulfide is a powder 100% of which passes through a screen of 100 meshes per inch.

3. The method of claim 1 wherein the liquid used to impregnate the molded part is replaced by a coal tar or petroleum pitch, with a softening point of from 70°–250° C., in solution or hot melt, omitting step e) of claim 1.

4. The method of claim 1 wherein the resin is hardened or cross-linked at 150° C. for 8 hours.

5. The method of claim 1 wherein the resin is a phenol-formaldehyde or furan derived condensation resin in solution.

6. The method of claim 1 wherein the cross-linked or hardened resin is carbonized to a temperature below 1000° C. for a period of 3–6 days.

7. The method of claim 1 wherein the electrode produced has from 15–50% by volume metal sulfide, from 3–30% by volume solid carbonaceous matrix, and 35–82% void volume.

8. The method of claim 1 wherein the inert atmosphere is nitrogen.

9. The electrode manufactured according to the method of claim 1.

* * * * *